(12) United States Patent
Hooper et al.

(10) Patent No.: US 6,952,824 B1
(45) Date of Patent: Oct. 4, 2005

(54) MULTI-THREADED SEQUENCED RECEIVE FOR FAST NETWORK PORT STREAM OF PACKETS

(75) Inventors: Donald F. Hooper, Shrewsbury, MA (US); Matthew J. Adiletta, Worcester, MA (US); Gilbert M. Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 667 days.

(21) Appl. No.: 09/710,439

(22) Filed: Nov. 10, 2000

Related U.S. Application Data

(63) Continuation-in-part of application No. 09/475,614, filed on Dec. 30, 1999.

(51) Int. Cl.[7] ............................................. G06F 9/46
(52) U.S. Cl. .................... 718/100; 718/102; 718/107
(58) Field of Search ............................. 709/238, 203; 370/229, 230, 394; 718/100–102, 107; 719/310, 719/312

(56) References Cited

U.S. PATENT DOCUMENTS

| | | | |
|---|---|---|---|
| 3,736,566 A | 5/1973 | Anderson et al. | |
| 4,709,347 A | 11/1987 | Kirk | |
| 5,627,829 A * | 5/1997 | Gleeson et al. | 370/230 |
| 5,781,551 A | 7/1998 | Born | |
| 6,032,190 A * | 2/2000 | Bremer et al. | 709/238 |
| 6,067,300 A | 5/2000 | Baumert et al. | |
| 6,085,215 A | 7/2000 | Ramakrishnan et al. | |
| 6,141,677 A | 10/2000 | Hanif et al. | |
| 6,282,169 B1 | 8/2001 | Kiremidjian | |
| 6,338,078 B1 * | 1/2002 | Chang et al. | 718/102 |
| 6,366,998 B1 | 4/2002 | Mohamed | |
| 6,393,026 B1 * | 5/2002 | Irwin | 370/401 |
| 6,463,527 B1 | 10/2002 | Vishkin | |
| 6,484,224 B1 * | 11/2002 | Robins et al. | 710/305 |
| 6,526,451 B2 | 2/2003 | Kasper | |
| 6,553,406 B1 * | 4/2003 | Berger et al. | 709/203 |
| 6,570,850 B1 | 5/2003 | Gutierrez et al. | |
| 6,631,422 B1 | 10/2003 | Althaus et al. | |
| 6,661,794 B1 * | 12/2003 | Wolrich et al. | 370/394 |
| 6,675,190 B1 | 1/2004 | Schabernack et al. | |
| 6,678,746 B1 * | 1/2004 | Russell et al. | 710/1 |

OTHER PUBLICATIONS

Vibhatavanij et al. "simultaneous multithreading-based routers" pp. 362-369, Aug. 2000 IEEE.*
Chandranmenon et al. "trading packet headers for packet processing" pp. 141-152, 1996 IEEE.*
Vibhatavanij, K. Simultaneous Multithreading-Based Routers, IEEE Xplore, Aug. 21, 2000.
Chandranmenon, Girish. Trading Packet Headers for Packet Processing, IEEE/ACM Transactions on Networking, Apr. 1996.
Dictionary of Computer Words American Heritage 1995.

* cited by examiner

*Primary Examiner*—St. John Courtenay, III
*Assistant Examiner*—Van Hoa Nguyen
(74) *Attorney, Agent, or Firm*—Robert A. Greenberg

(57) ABSTRACT

A method of processing network data in a network processor includes using three or more threads to process a beginning portion, a middle portion, and an end portion of data packet. The first thread processes the beginning portion; one or more middle threads process the middle portion, and a last thread processes the end portion. First information is indirectly passed from the first thread to the last thread via a first buffer with the middle threads progressively updating the first information. Second information is directly passed from the first thread to the last thread via a second buffer.

7 Claims, 16 Drawing Sheets

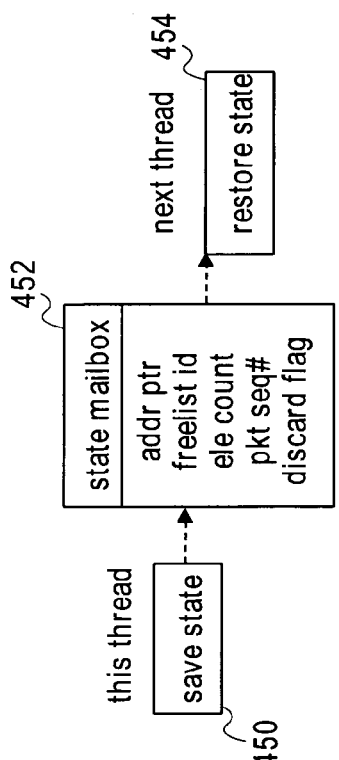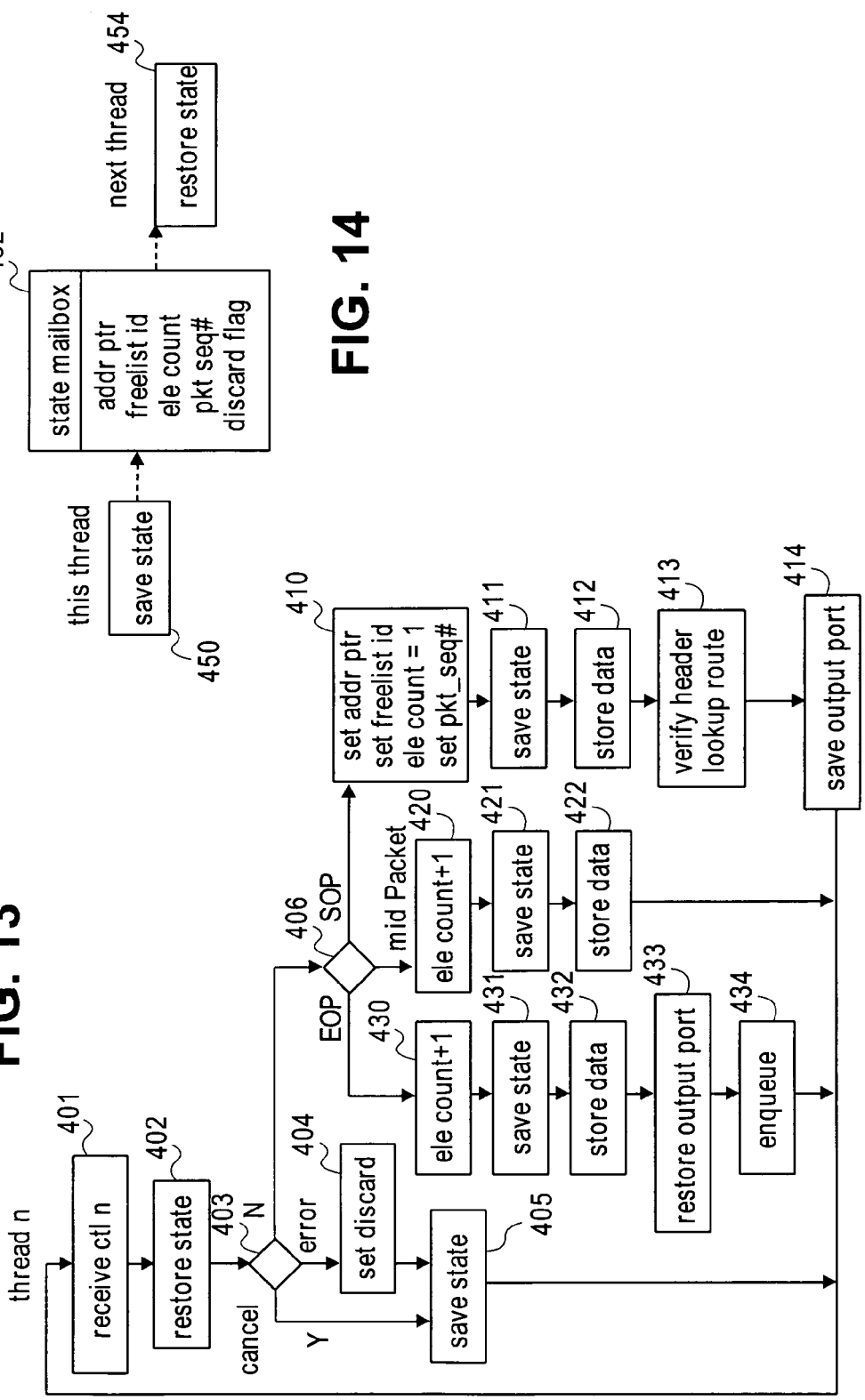

MULTI-THREADED SEQUENCED RECEIVE FOR FAST NETWORK PORT STREAM OF PACKETS

RELATED APPLICATIONS

This application is a continuation-in-part of U.S. patent application Ser. No. 09/475,614 filed Dec. 30, 1999.

BACKGROUND OF THE INVENTION

1. Field of the Invention

The described invention relates to the field of network communications. In particular, the invention relates to a method for using multiple threads to process incoming network data.

2. Description of Related Art

Networking products such as routers require high speed components for packet data movement, i.e., collecting packet data from incoming network device ports and queuing the packet data for transfer to appropriate forwarding device ports. They also require high-speed special controllers for processing the packet data, that is, parsing the data and making forwarding decisions. Because the implementation of these high-speed functions usually involves the development of ASIC or custom devices, such networking products are of limited flexibility. For example, each controller is assigned to service network packets from one or more given ports on a permanent basis.

BRIEF DESCRIPTION OF THE DRAWINGS

FIG. 13 shows a flowchart of the process that receive threads take based on the type of MPKT that they process.

FIG. 14 shows one embodiment of a state mailbox used to transfer state from one thread to another.

DETAILED DESCRIPTION

A method of using multiple receive threads to receive data in a round robin scheme is disclosed. First, one embodiment of the hardware that enables the multiple thread system is described. Then the method of employing the multiple threads in a round robin fashion is described.

Figure 1:
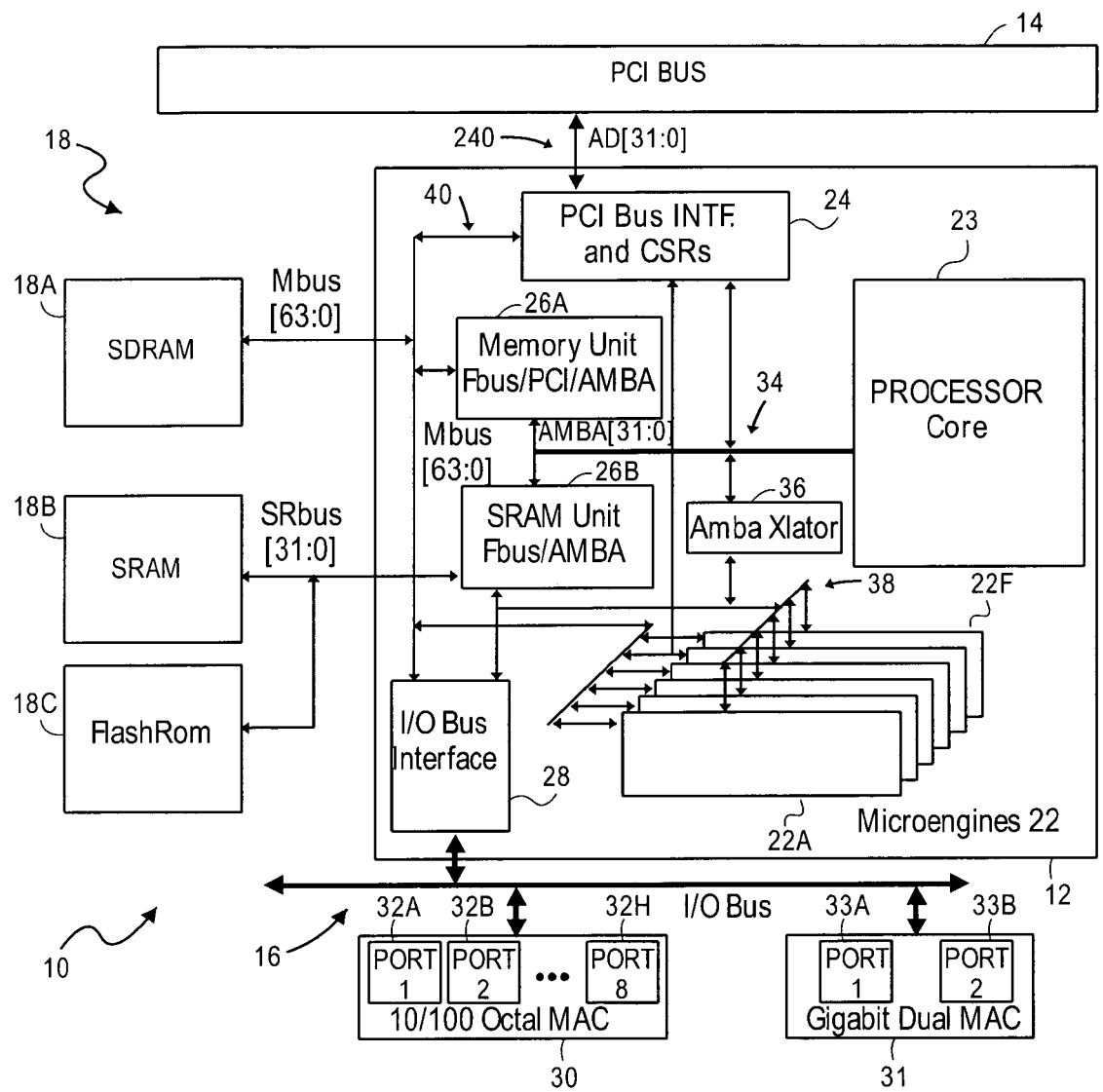
FIG. 1 is a block diagram of a communication system employing a hardware-based multi-threaded processor.
Figure 2:
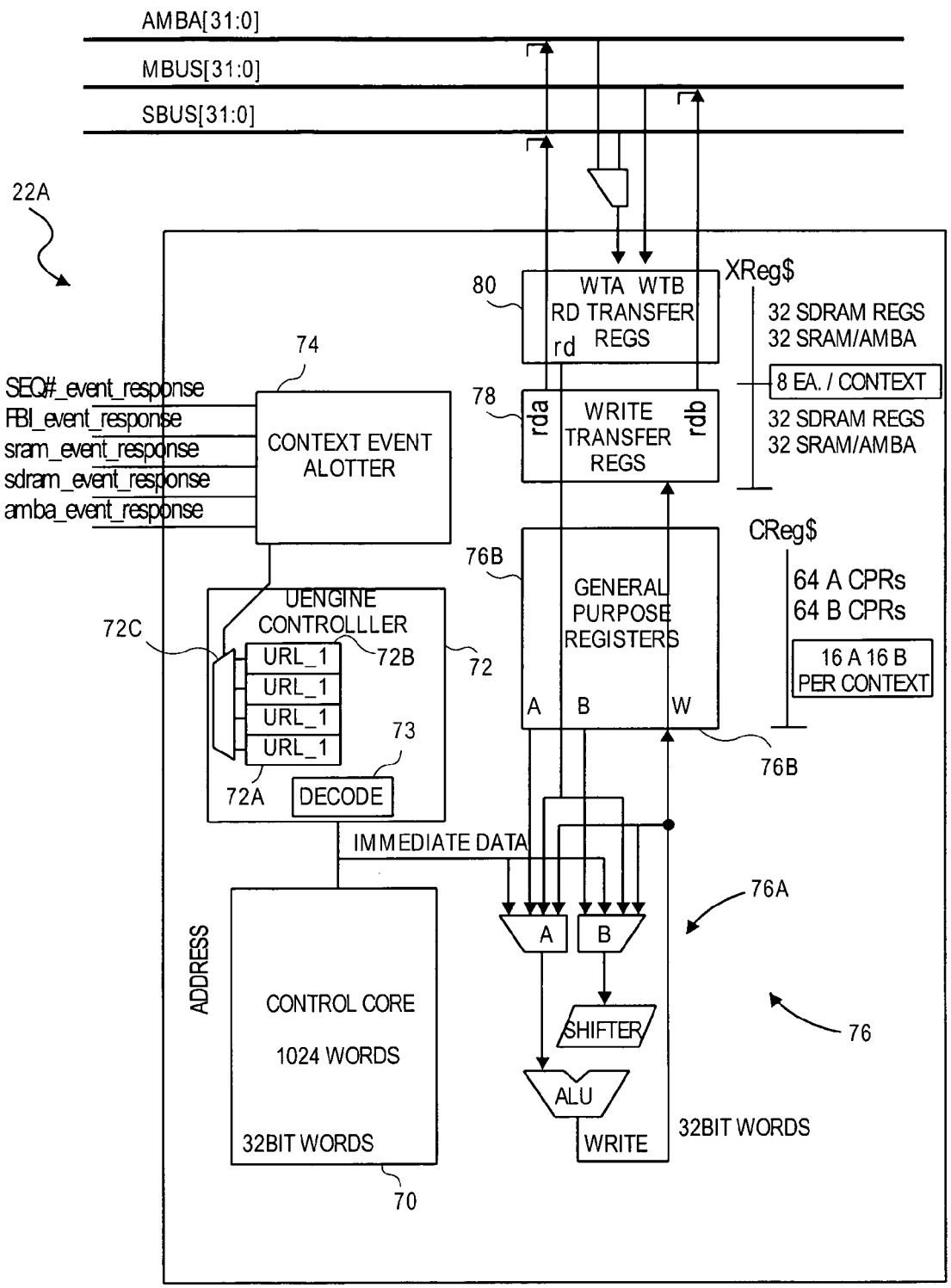
FIG. 2 is a block diagram of a microengine employed in the hardware-based multi-threaded processor of FIG. 1.

Referring to FIG. 1, a communication system 10 includes a parallel, hardware-based multi-threaded processor 12. The hardware based multi-threaded processor 12 is coupled to a first peripheral bus (shown as a PCI bus) 14, a second peripheral bus referred to as an I/O bus 16 and a memory system 18. The system 10 is especially useful for tasks that can be broken into parallel subtasks or functions. The hardware-based multi-threaded processor 12 includes multiple microengines 22, each with multiple hardware controlled program threads that can be simultaneously active and independently work on a task. In the embodiment shown, there are six microengines 22a–22f and each of the six microengines is capable of processing four program threads, as will be described more fully below.

The hardware-based multi-threaded processor 12 also includes a processor 23 that assists in loading microcode control for other resources of the hardware-based multi-threaded processor 12 and performs other general purpose computer type functions such as handling protocols, exceptions, extra support for packet processing where the microengines pass the packets off for more detailed processing. In one embodiment, the processor 23 is a StrongARM (ARM is a trademark of ARM Limited, United Kingdom) core based architecture. The processor (or core) 23 has an operating system through which the processor 23 can call functions to operate on the microengines 22a–22f. The processor 23 can use any supported operating system, preferably real-time operating system. For the core processor implemented as a StrongARM architecture, operating systems such as MicrosoftNT real-time, VXWorks and :CUS, a freeware operating system available over the Internet, can be used.

The six microengines 22a–22f each operate with shared resources including the memory system 18, a PCI bus interface 24 and an I/O bus interface 28. The PCI bus interface provides an interface to the PCI bus 14. The I/O bus interface 28 is responsible for controlling and interfacing the processor 12 to the I/O bus 16. The memory system 18 includes a Synchronous Dynamic Random Access Memory (SDRAM) 18a, which is accessed via an SDRAM controller 26a, a Static Random Access Memory (SRAM) 18b, which is accessed using an SRAM controller 26b, and a nonvolatile memory (shown as a FlashROM) 18c that is used for boot operations. The SDRAM 16a and SDRAM controller 26a are typically used for processing large volumes of data, e.g., processing of payloads from network packets. The SRAM 18b and SRAM controller 26b are used in a networking implementation for low latency, fast access tasks, e.g., accessing look-up tables, memory for the processor 23, and so forth. The microengines 22a–22f can execute memory reference instructions to either the SDRAM controller 26a or the SRAM controller 18b.

The hardware-based multi-threaded processor 12 interfaces to network devices such as a media access controller ("MAC") device, including a "slow" device 30 (e.g., 10/100BaseT Ethernet MAC) and/or a "fast" device 31, such as Gigabit Ethernet MAC, ATM device or the like, over the I/O Bus 16. In the embodiment shown, the slow device 30 is an 10/100 BaseT Octal MAC device and thus includes 8 slow ports 32a–32h, and the fast device is a Dual Gigabit MAC device having two fast ports 33a, 33b. Each of the network devices attached to the I/O Bus 16 can include a plurality of ports to be serviced by the processor 12. Other devices, such as a host computer (not shown), that may be coupled to the PCI bus 14 are also serviced by the processor 12. In general, as a network processor, the processor 12 can interface to any type of communication device or interface that receives/sends large amounts of data. The processor 12 functioning as a network processor could receive units of packet data from the devices 30, 31 and process those units of packet data in a parallel manner, as will be described. The unit of packet data could include an entire network packet (e.g., Ethernet packet) or a portion of such a packet.

Each of the functional units of the processor 12 are coupled to one or more internal buses. The internal buses include an internal core bus 34 (labeled "AMBA") for coupling the processor 23 to the memory controllers 26a, 26b and to an AMBA translator 36. The processor 12 also includes a private bus 38 that couples the microengines 22a–22f to the SRAM controller 26b, AMBA translator 36 and the Fbus interface 28. A memory bus 40 couples the memory controllers 26a, 26b to the bus interfaces 24, 28 and the memory system 18.

Figure 3:
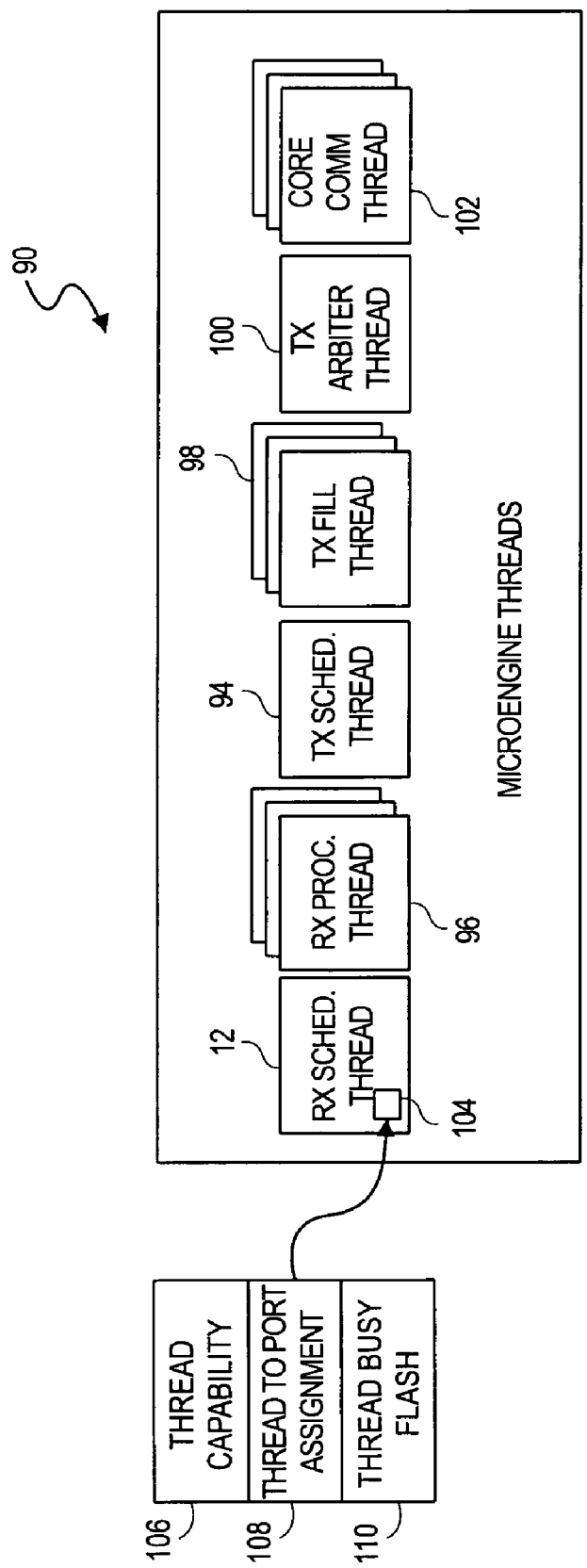
FIG. 3 is an illustration of an exemplary thread task assignment.

Referring to FIG. 3, an exemplary one of the microengines 22a–22f is shown. The microengine 22a includes a control store 70 for storing a microprogram. The microprogram is loadable by the central processor 20. The microengine 70 also includes control logic 72. The control logic 72 includes an instruction decoder 73 and program counter units 72a–72d. The four program counters are maintained in hardware.

The microengine 22a also includes context event switching logic 74. The context event switching logic 74 receives messages (e.g., SEQ_#_EVENT_RESPONSE; FBI_EVENT_RESPONSE; SRAM_EVENT_RESPONSE; SDRAM_EVENT_RESPONSE; and AMBA_EVENT_RESPONSE) from each one of the share resources, e.g., SRAM 26b, SDRAM 26a, or processor core 20, control and status registers, and so forth. These messages provides information on whether a requested function has completed. Based on whether or not the function requested by a thread has completed and signaled completion, the thread needs to wait for that complete signal, and if the thread is enabled to operate, then the thread is placed on an available thread list (not shown). As earlier mentioned, in one embodiment, the microengine 22a can have a maximum of four threads of execution available.

In addition to event signals that are local to an executing thread, the microengine employs signaling states that are global. With signaling states, an executing thread can broadcast a signal state to all microengines 22. Any and all threads in the microengines can branch on these signaling states. These signaling states can be used to determine availability of a resource or whether a resource is due for servicing.

The context event logic 74 has arbitration for the four threads. In one embodiment, the arbitration is a round robin mechanism. However, other arbitration techniques, such as priority queuing or weighted fair queuing, could be used. The microengine 22a also includes an execution box (EBOX) data path 76 that includes an arithmetic logic unit (ALU) 76a and a general purpose register (GPR) set 76b. The ALU 76a performs arithmetic and logical functions as well as shift functions.

The microengine 22a further includes a write transfer register file 78 and a read transfer register file 80. The write transfer register file 78 stores data to be written to a resource. The read transfer register file 80 is for storing return data from a resource. Subsequent to or concurrent with the data arrival, an event signal from the respective shared resource, e.g., memory controllers 26a, 26b, or core 23, will be provided to the context event arbiter 74, which in turn alerts the thread that the data is available or has been sent. Both transfer register files 78, 80 are connected to the EBOX 76 through a data path. In the described implementation, each of the register files includes 64 registers.

The functionality of the microengine threads is determined by microcode loaded (via the core processor) for a particular user's application into each microengine's control store 70. Referring to FIG. 3, an exemplary thread task assignment 90 is shown. Typically, one of the microengine threads is assigned to serve as a receive scheduler 92 and another as a transmit scheduler 94. A plurality of threads are configured as receive processing threads 96 and transmit processing (or "fill") threads 98. Other thread task assignments include a transmit arbiter 100 and one or more core communication threads 102. Once launched, a thread performs its function independently.

The receive scheduler thread 92 assigns packets to receive processing threads 96. In a packet forwarding application for a bridge/router, for example, the receive processing thread parses packet headers and performs lookups based in the packet header information. Once the receive processing thread or threads 96 has processed the packet, it either sends the packet as an exception to be further processed by the core 23 (e.g., the forwarding information cannot be located in lookup and the core processor must learn it), or stores the packet in the SDRAM and queues the packet in a transmit queue by placing a packet link descriptor for it in a transmit queue associated with the transmit (forwarding port) indicated by the header/lookup. The transmit queue is stored in the SRAM. The transmit arbiter thread 100 prioritizes the transmit queues and the transmit scheduler thread 94 assigns packets to transmit processing threads that send the packet out onto the forwarding port indicated by the header/lookup information during the receive processing.

The receive processing threads 96 may be dedicated to servicing particular ports or may be assigned to ports dynamically by the receive scheduler thread 92. For certain system configurations, a dedicated assignment may be desirable. For example, if the number of ports is equal to the number of receive processing threads 96, then it may be quite practical as well as efficient to assign the receive processing threads to ports in a one-to-one, dedicated assignment. In other system configurations, a dynamic assignment may provide a more efficient use of system resources.

The receive scheduler thread 92 maintains scheduling information 104 in the GPRs 76b of the microengine within which it executes. The scheduling information 104 includes thread capabilities information 106, port-to-thread assignments (list) 108 and "thread busy" tracking information 110. At minimum, the thread capabilities information informs the receive scheduler thread as to the type of tasks for which the other threads are configured, e.g., which threads serve as receive processing threads. Additionally, it may inform the receive scheduler of other capabilities that may be appropriate to the servicing of a particular port. For instance, a receive processing thread may be configured to support a certain protocol, or a particular port or ports. A current list of the ports to which active receive processing threads have been assigned by the receive scheduler thread is maintained in the thread-to-port assignments list 108. The thread busy mask register 110 indicates which threads are actively servicing a port. The receive scheduler uses all of this scheduling information in selecting threads to be assigned to ports that require service for available packet data, as will be described in further detail below.

Figure 4:
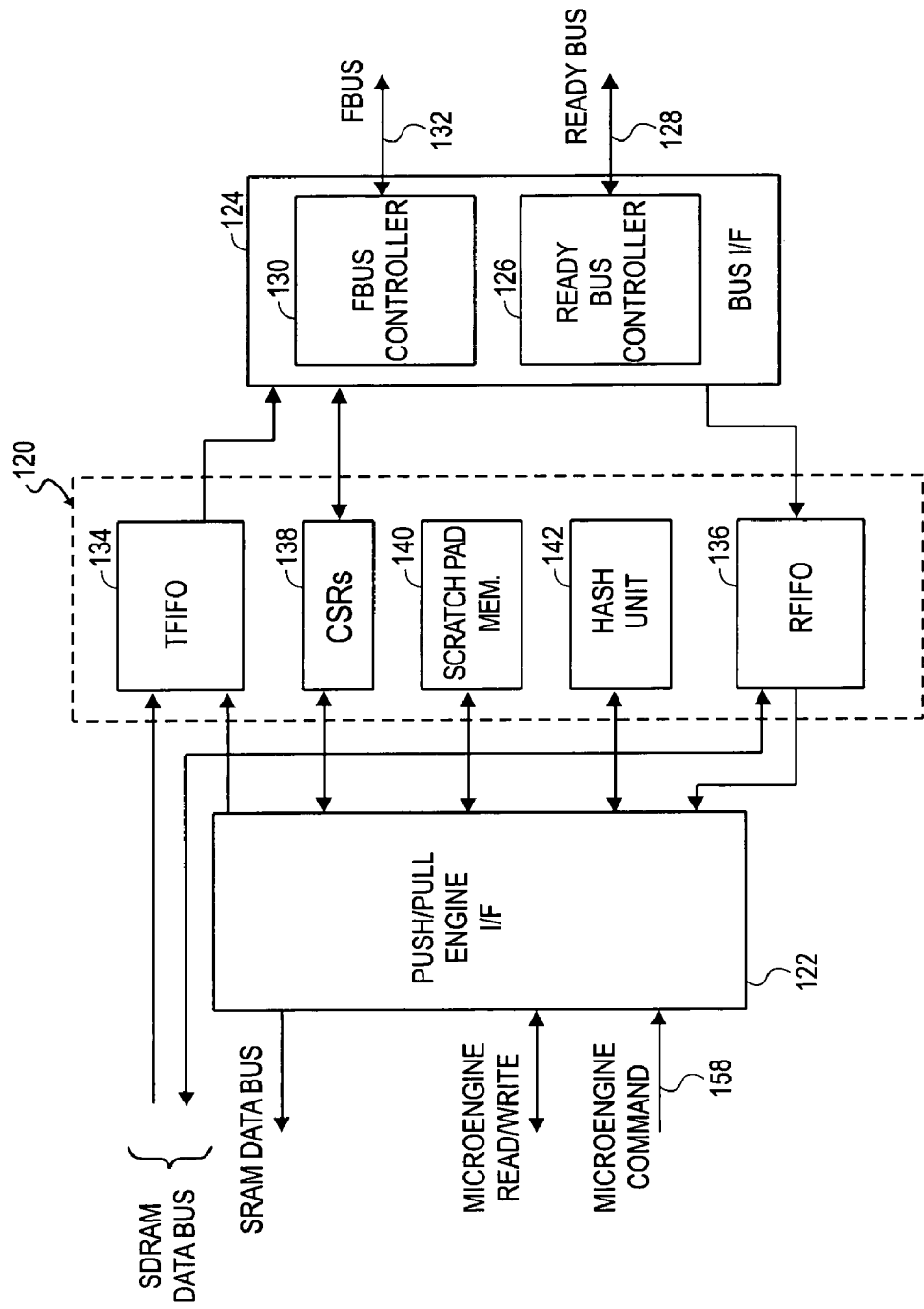
FIG. 4 is a block diagram of an I/O bus interface shown in FIG. 1.

Referring to FIG. 4, the I/O bus interface 28 includes shared resources 120, which are coupled to a push/pull engine interface 122 and a bus interface unit 124. The bus interface unit 124 includes a ready bus controller 126 connected to a ready bus 128 and an Fbus controller 130 for connecting to a portion of the I/O bus referred to as an Fbus 132. Collectively, the ready bus 128 and the Fbus 132 make up the signals of the I/O bus 16 (FIG. 1). The resources 120 include two FIFOs, a transmit FIFO 134 and a receive FIFO 136, as well as CSRs 138, a scratchpad memory 140 and a hash unit 142. The Fbus 132 transfers data between the ports of the devices 30, 31 and the I/O bus interface 28. The ready bus 128 is an 8-bit bus that performs several functions. It is used to read control information about data availability from the devices 30, 31, e.g., in the form of ready status flags. It also provides flow control information to the devices 30, 31, and may be used to communicate with another network processor 12 that is connected to the Fbus 132. Both buses 128, 132 are accessed by the microengines 22 through the CSRs 138. The CSRs 138 are used for bus configuration, for accessing the bus interface unit 124, and for inter-thread signaling. They also include several counters and thread status registers, as will be described. The CSRs 138 are accessed by the microengines 22 and the core 23. The receive FIFO (RFIFO) 136 includes data buffers for holding data received from the Fbus 132 and is read by the microengines 22. The transmit FIFO (TFIFO) 134 includes data buffers that hold data to be transmitted to the Fbus 132 and is written by the microengines 22. The scatchpad memory 140 is accessed by the core 23 and microengines 22, and supports a variety of operations, including read and write operations, as well as bit test, bit test/clear and increment operations. The hash unit 142 generates hash indexes for 48-bit or 64-bit data and is accessed by the microengines 22 during lookup operations.

The processors 23 and 22 issue commands to the push/pull engine interface 122 when accessing one of the resources 120. The push/pull engine interface 122 places the commands into queues (not shown), arbitrates which commands to service, and moves data between the resources 120, the core 23 and the microengines 22. In addition to servicing requests from the core 23 and microengines 22, the push/pull engines 122 also service requests from the ready bus 128 to transfer control information to a register in the microengine read transfer registers 80.

When a thread issues a request to a resource 120, a command is driven onto an internal command bus 150 and placed in queues within the push/pull engine interface 122. Receive/read-related instructions (such as instructions for reading the CSRs) are written to a "push" command queue.

The CSRs 138 include the following types of registers: Fbus receive and transmit registers; Fbus and ready bus configuration registers; ready bus control registers; hash unit configuration registers; interrupt registers; and several miscellaneous registers, including a thread status registers. Those of the registers which pertain to the receive process will be described in further detail.

The interrupt/signal registers include an INTER_THD_SIG register for inter-thread signaling. Any thread within the microengines 22 or the core 23 can write a thread number to this register to signal an inter-thread event.

Figure 5:
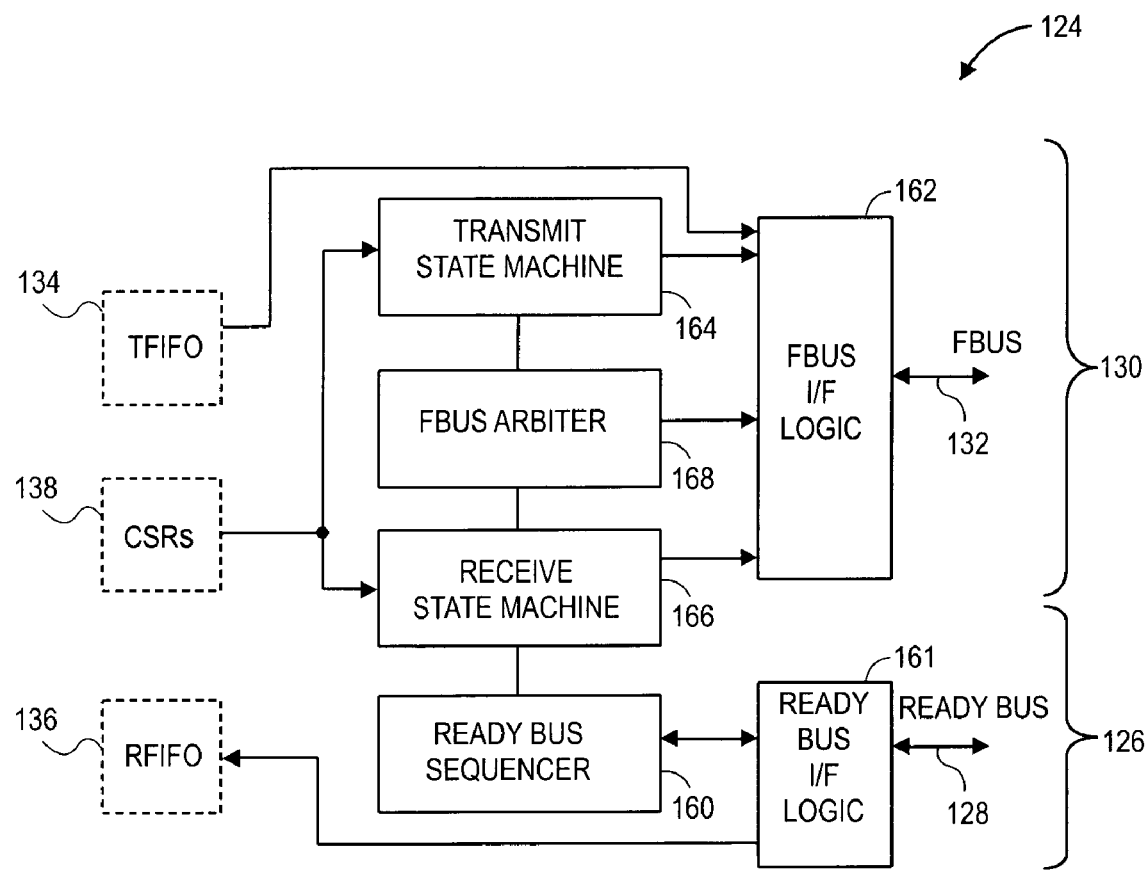
FIG. 5 is a detailed diagram of a bus interface unit employed by the I/O bus interface of FIG. 4.

Further details of the Fbus controller 130 and the ready bus controller 126 are shown in FIG. 5. The ready bus controller 126 includes a programmable sequencer 160 for retrieving MAC device status information from the MAC devices 30, 31, and asserting flow control to the MAC devices over the ready bus 128 via ready bus interface logic 161. The Fbus controller 130 includes Fbus interface logic 162, which is used to transfer data to and from the devices 30, 31, is controlled by a transmit state machine (TSM) 164 and a receive state machine (RSM) 166. In the embodiment herein, the Fbus 132 may be configured as a bidirectional 64-bit bus, or two dedicated 32-bit buses. In the unidirectional, 32-bit configuration, each of the state machines owns its own 32-bit bus. In the bidirectional configuration, the ownership of the bus is established through arbitration. Accordingly, the Fbus controller 130 further includes a bus arbiter 168 for selecting which state machine owns the Fbus 132.

Figure 6A:
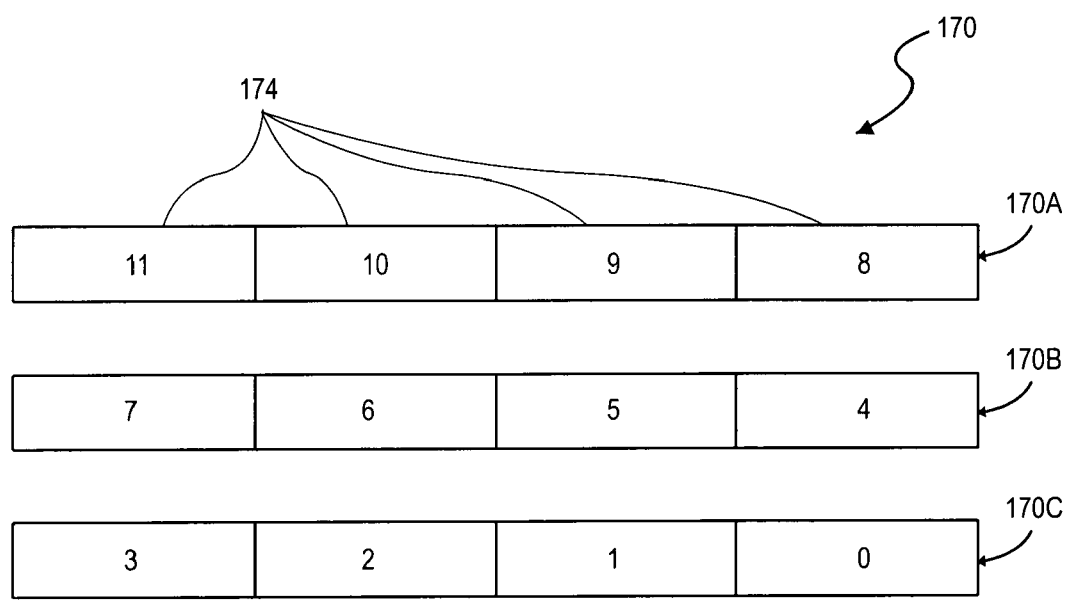
FIGS. 6A–6F are illustrations of various bus configuration control and status registers (CSRs).
Figure 6B:
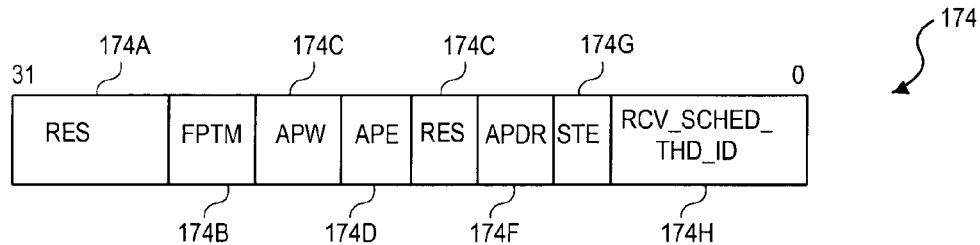

Some of the relevant CSRs used to program and control the ready bus 128 and Fbus 132 for receive processes are shown in FIGS. 6A–6F. Referring to FIG. 6A, RDYBUS_TEMPLATE_PROGx registers 170 are used to store instructions for the ready bus sequencer. Each register of these 32-bit registers 170a, 170b, 170c, includes four, 8-bit instruction fields 172. Referring to FIG. 6B, a RCV_RDY_CTL register 174 specifies the behavior of the receive state machine 166. The format is as follows: a reserved field (bits 31:15) 174a; a fast port mode field (bits 14:13) 174b, which specifies the fast (Gigabit) port thread mode, as will be described; an auto push prevent window field (bits 12:10) 174c for specifying the autopush prevent window used by the ready bus sequencer to prevent the receive scheduler from accessing its read transfer registers when an autopush operation (which pushes information to those registers) is about to begin; an autopush enable (bit 9) 174d, used to enable autopush of the receive ready flags; another reserved field (bit 8) 174e; an autopush destination field (bits 7:6) 174f for specifying an autopush operation's destination register; a signal thread enable field (bit 5) 174g which, when set, indicates the thread to be signaled after an autopush operation; and a receive scheduler thread ID (bits 4:0) 174h, which specifies the ID of the microengine thread that has been configured as a receive scheduler.

Figure 6C:
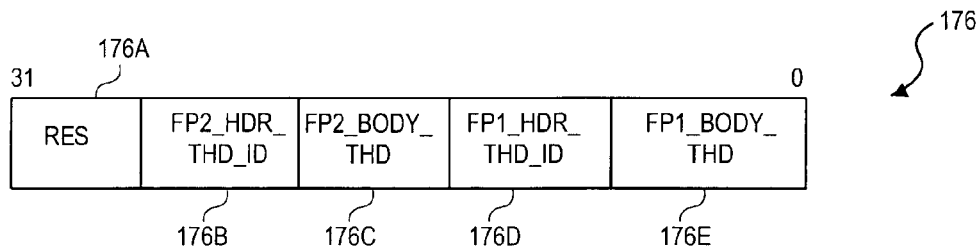
Figure 6D:
Figure 6E:
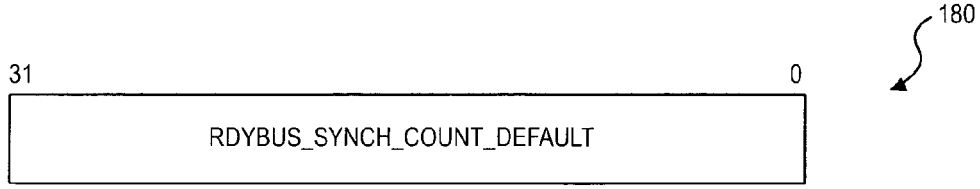
Figure 6F:

Referring to FIG. 6C, a REC_FASTPORT_CTL register 176 is relevant to receiving packet data from fast ports (fast port mode) only. It enables receive threads to view the current assignment of header and body thread assignments for the two fast ports, as will be described. It includes the following fields: a reserved field (bits 31:20) 176a; an FP2_HDR_THD_ID field (bits 19:15) 176b, which specifies the fast port 2 header receive (processing) thread ID; an FP2_BODY_THD_ID field (bits 14:10) 176c for specifying the fast port 2 body receive processing thread ID; an FP1_HDR_THD_ID field (bits 9:5) 176d for specifying the fast port 1 header receive processing thread ID; and an FP1_BODY_THD_ID field (bits 4:0) 176e for specifying the fast port 1 body processing thread ID. The manner in which these fields are used by the RSM 166 will be described in detail later.

Although not depicted in detail, other bus registers include the following: a RDYBUS_TEMPLATE_CTL register 178 (FIG. 6D), which maintains the control information for the ready bus and the Fbus controllers, for example, it enables the ready bus sequencer; a RDYBUS_SYNCH_COUNT_DEFAULT register 180 (FIG. 6E), which specifies the program cycle rate of the ready bus sequencer; and an FP_FASTPORT_CTL register 182 (FIG. 6F), which specifies how many Fbus clock cycles the RSM 166 must wait between the last data transfer and the next sampling of fast receive status, as will be described.

Figure 7A:
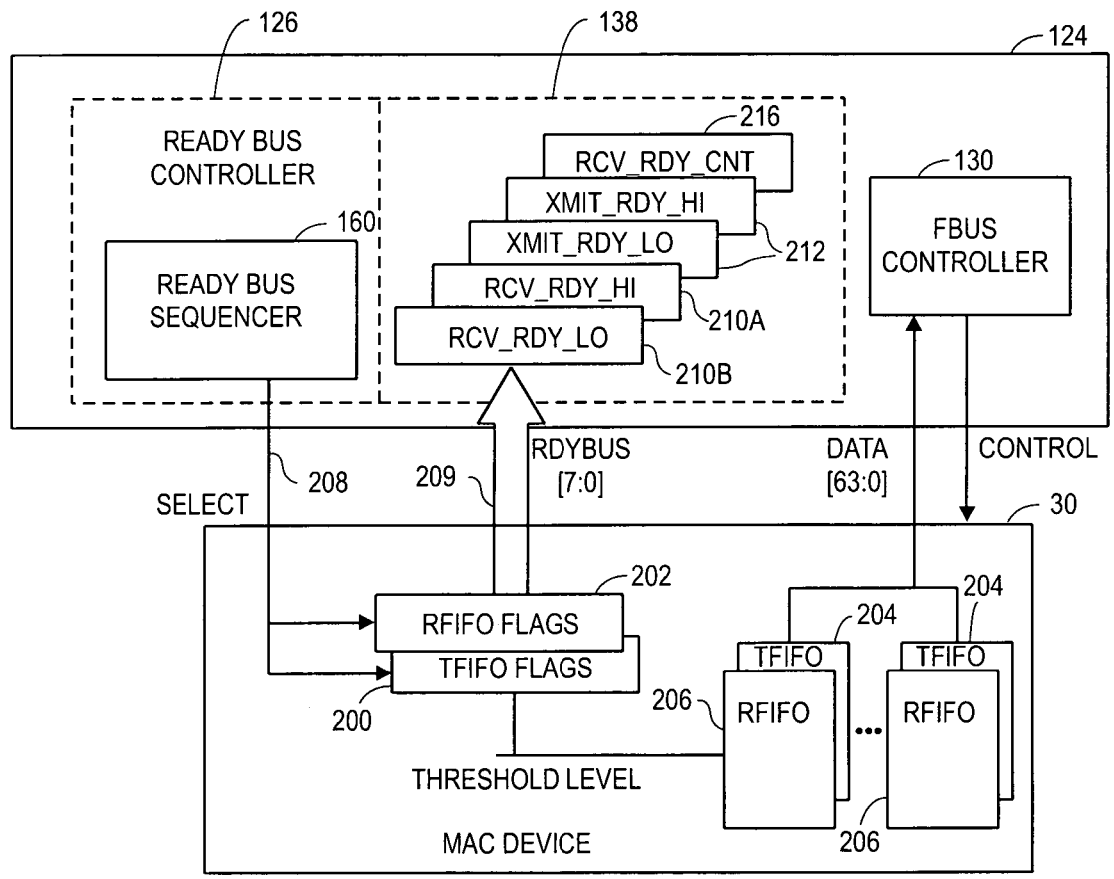
FIG. 7A is a detailed diagram illustrating the interconnection between a plurality of 10/100 Ethernet ("slow") ports and the bus interface unit.

Referring to FIG. 7A, the MAC device 30 provides transmit status flags 200 and receive status flags 202 that indicate whether the amount of data in an associated transmit FIFO 204 or receive FIFO 206 has reached a certain threshold level. The ready bus sequencer 160 periodically polls the ready flags (after selecting either the receive ready flags 202 or the transmit ready flags 200 via a flag select 208) and places them into appropriate ones of the CSRs 138 by transferring the flag data over ready bus data lines 209. In this embodiment, the ready bus includes 8 data lines for transferring flag data from each port to the Fbus interface unit 124. The CSRs in which the flag data are written are defined as RCV_RDY_HI/LO registers 210 for receive ready flags and XMIT_RDY_HI/LO registers 212 for transmit ready flags, if the ready bus sequencer 160 is programmed to execute receive and transmit ready flag read instructions, respectively.

When the ready bus sequencer is programmed with an appropriate instruction directing it to interrogate MAC receive ready flags, it reads the receive ready flags from the MAC device or devices specified in the instruction and places the flags into RCV_RDY_HI register 210a and a RCV_RDY_LO register 210b, collectively, RCV_RDY registers 210. Each bit in these registers corresponds to a different device port on the I/O bus.

Figure 7B:
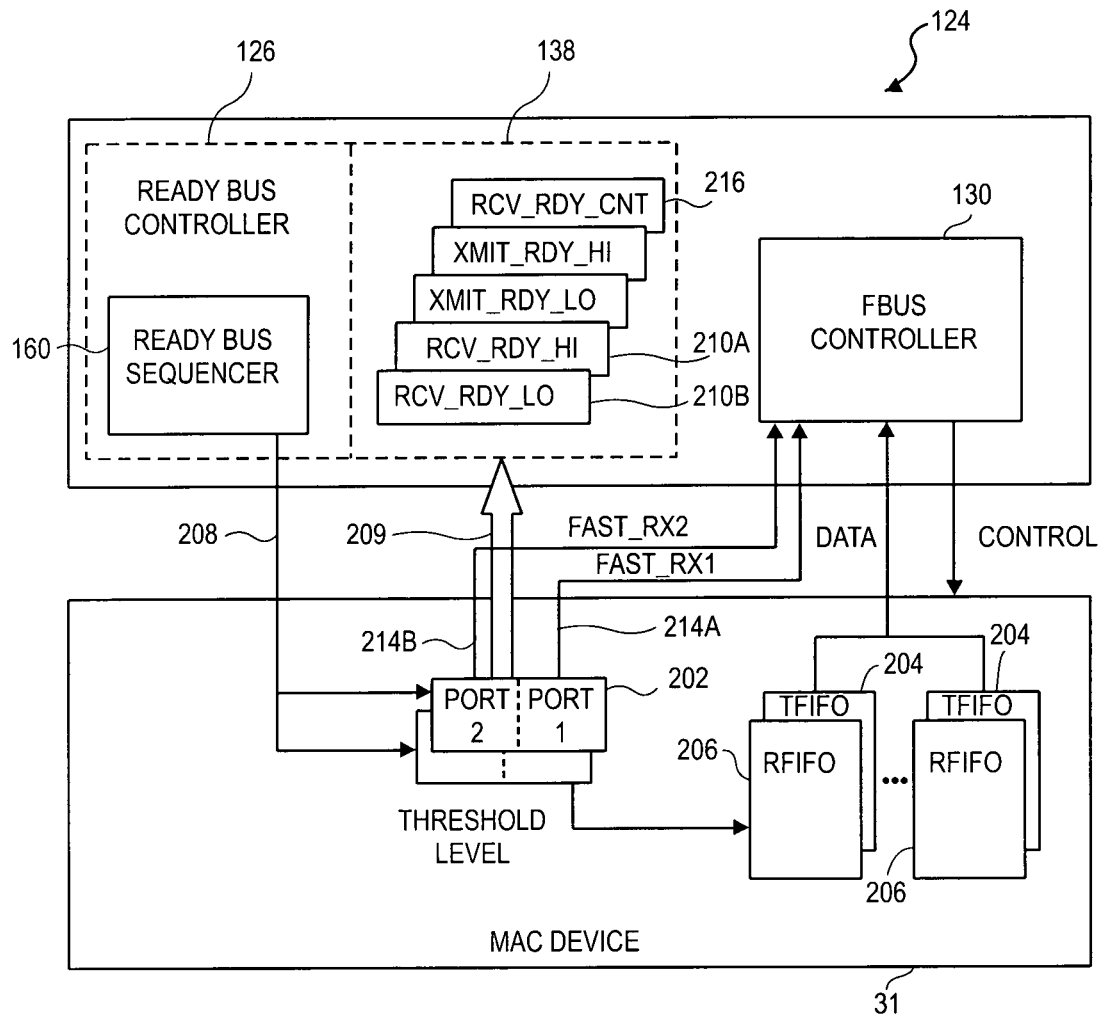
FIG. 7B is a detailed diagram illustrating the interconnection between two Gigabit Ethernet ("fast") ports and the bus interface unit.

Also, and as shown in FIG. 7B, the bus interface unit 124 also supports two fast port receive ready flag pins FAST_RX1 214a and FAST_RX2 214b for the two fast ports of the fast MAC device 31. These fast port receive ready flag pins are read by the RSM 166 directly and placed into an RCV_RDY_CNT register 216.

The RCV_RDY_CNT register 216 is one of several used by the receive scheduler to determine how to issue a receive request. It also indicates whether a flow control request is issued.

Figure 8A:
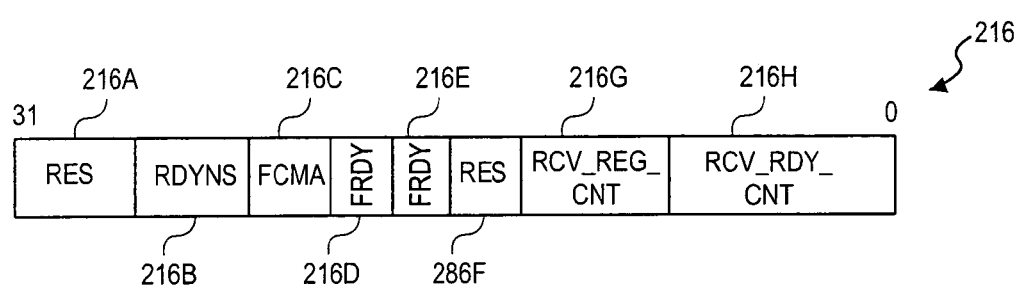
FIGS. 8A–8C are illustrations of the formats of the RCV_RDY_CTL, RCV_RDY_HI and RCV_RDY_LO CSR registers, respectively.

Referring to FIG. 8A, the format of the RCV_RDY_CNT register 216 is as follows: bits 31:28 are defined as a reserved field 216a; bit 27 is defined as a ready bus master field 216b and is used to indicate whether the ready bus 128 is configured as a master or slave; a field corresponding to bit 26 216c provides flow control information; bits 25 and 24 correspond to FRDY2 field 216d and FRDY1 field 216e, respectively. The FRDY2 216d and FRDY1 216e are used to store the values of the FAST_RX2 pin 214b and FAST_RX1 pin 214a, respectively, both of which are sampled by the RSM 166 each Fbus clock cycle; bits 23:16 correspond to a reserved field 216f; a receive request count field (bits 15:8) 216g specifies a receive request count, which is incremented after the RSM 166 completes a receive request and data is available in the RFIFO 136; a receive ready count field (bits 7:0) 216h specifies a receive ready count, an 8-bit counter that is incremented each time the ready bus sequencer 160 writes the ready bus registers RCV_RDY_CNT register 216, the RCV_RDY_LO register 210b and RCV_RDY_HI register 210a to the receive scheduler read transfer registers.

There are two techniques for reading the ready bus registers: "autopush" and polling. The autopush instruction may be executed by the ready bus sequencer 160 during a receive process (rxautopush) or a transmit process (txautopush). Polling requires that a microengine thread periodically issue read references to the I/O bus interface 28.

The rxautopush operation performs several functions. It increments the receive ready count in the RCV_RDY_CNT register 216. If enabled by the RCV_RDY_CTL register 174, it automatically writes the RCV_RDY_CNT 216, the RCV_RDY_LO and RCV_RDY_HI registers 210b, 210a to the receive scheduler read transfer registers and signals to the receive scheduler thread 92 (via a context event signal) when the rxautopush operation is complete.

The ready bus sequencer 160 polls the MAC FIFO status flags periodically and asynchronously to other events occurring in the processor 12. Ideally, the rate at which the MAC FIFO ready flags are polled is greater than the maximum rate at which the data is arriving at the MAC ports. Thus, it is necessary for the receive scheduler thread 92 to determine whether the MAC FIFO ready flags read by the ready bus sequencer 160 are new, or whether they have been read already. The rxautopush instruction increments the receive ready count in the RCV_RDY_CNT register 216 each time the instruction executes. The RCV_RDY_CNT register 216 can be used by the receive scheduler thread 92 to determine whether the state of specific flags have to be evaluated or whether they can be ignored because receive requests have been issued and the port is currently being serviced. For example, if the FIFO threshold for a Gigabit Ethernet port is set so that the receive ready flags are asserted when 64 bytes of data are in the MAC receive FIFO 206, then the state of the flags does not change until the next 64 bytes arrive 5120 ns later. If the ready bus sequencer 160 is programmed to collect the flags four times each 5120 ns period, the next three sets of ready flags that are to be collected by the ready bus sequence 160 can be ignored.

When the receive ready count is used to monitor the freshness of the receive ready flags, there is a possibility that the receive ready flags will be ignored when they are providing new status. For a more accurate determination of ready flag freshness, the receive request count may be used. Each time a receive request is completed and the receive control information is pushed onto the RCV_CNTL register 232, the the RSM 166 increments the receive request count. The count is recorded in the RCV_RDY_CNT register the first time the ready bus sequencer executes an rxrdy instruction for each program loop. The receive scheduler thread 92 can use this count to track how many requests the receive state machine has completed. As the receive scheduler thread issues commands, it can maintain a list of the receive requests it submits and the ports associated with each such request.

Figure 8B:
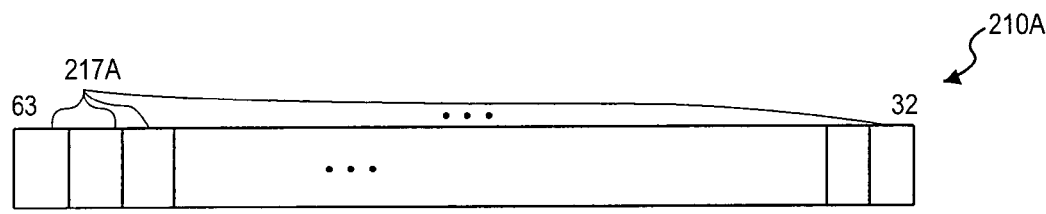
Figure 8C:
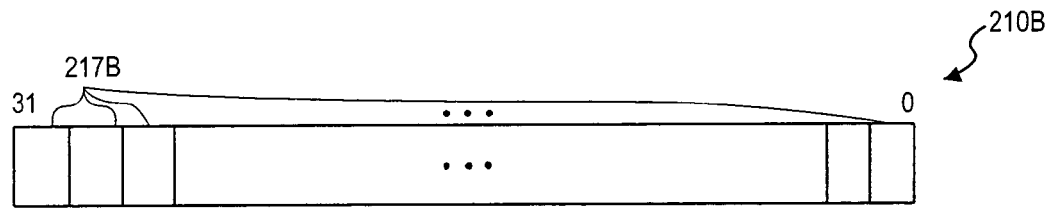

Referring to FIGS. 8B and 8C, the registers RCV_RDY_HI 210a and RCV_RDY_LO 210b have a flag bit 217a, 217b, respectively, corresponding to each port.

Figure 9:
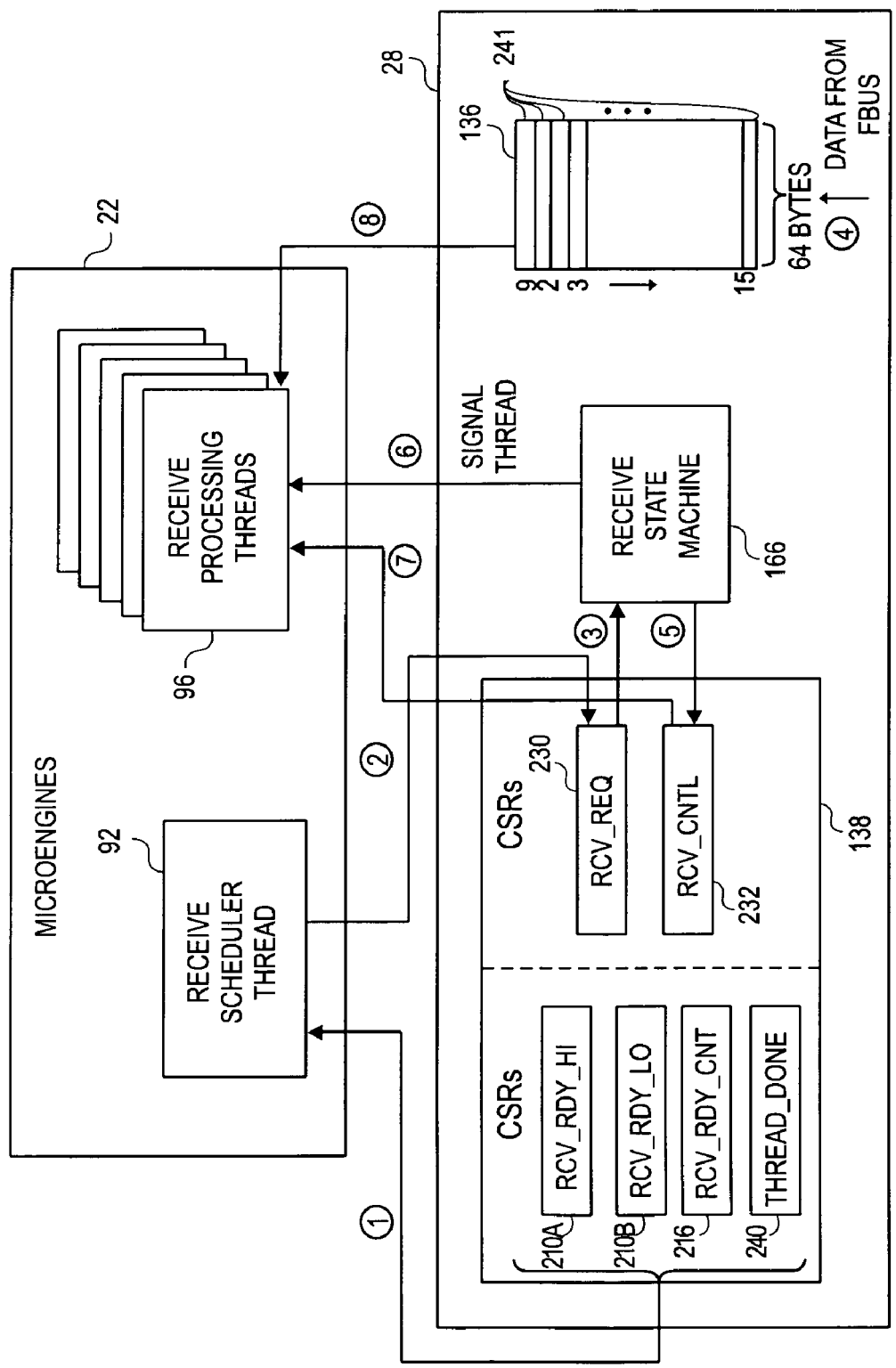
FIG. 9 is a depiction of the receive threads and their interaction with the I/O bus interface during a receive process.

Referring to FIG. 9, the receive scheduler thread 92 performs its tasks as quickly as possible to ensure that the RSM 166 is always busy, that is, that there is always a receive request waiting to be processed by the RSM 166. Several tasks performed by the receive scheduler 92 are as follows. The receive scheduler 92 determines which ports need to be serviced by reading the RCV_RDY_HI, RCV_RDY_LO and RCV_RDY_CNT registers 210a, 210b and 216, respectively. The receive scheduler 92 also determines which receive ready flags are new and which are old using either the receive request count or the receive ready count in the RCV_RDY_CNT register, as described above. It tracks the thread processing status of the other microengine threads by reading thread done status CSRs 240. The receive scheduler thread 92 initiates transfers across the Fbus 132 via the ready bus, while the receive state machine 166 performs the actual read transfer on the Fbus 132. The receive scheduler 92 interfaces to the receive state machine 166 through two FBI CSRs 138: an RCV_REQ register 230 and an RCV_CNTL register 232. The RCV_REQ register 230 instructs the receive state machine on how to receive data from the Fbus 132.

Still referring to FIG. 9, a process of initiating an Fbus receive transfer is shown. Having received ready status information from the RCV_RDY_HI/LO registers 210a, 210b as well as thread availability from the thread done register 240 (transaction "1", as indicated by the arrow labeled 1), the receive scheduler thread 92 determines if there is room in the RCV_REQ FIFO 230 for another receive request. If it determines that RCV_REQ FIEFO 230 has room to receive a request, the receive scheduler thread 92 writes a receive request by pushing data into the RCV_REQ FIFO 230 (transaction 2). The RSM 166 processes the request in the RCV_REQ FIFO 230 (transaction 3). The RSM 166 responds to the request by moving the requested data into the RFIFO 136 (transaction 4), writing associated control information to the RCV_CTL FIFO 232 (transaction 5) and generating a start receive signal event to the receive processing thread 96 specified in the receive request (transaction 6). The RFIFO 136 includes 16 elements 241, each element for storing a 64 byte segment of data referred to herein as a MAC packet ("MPKT"). The RSM 166 reads packets from the MAC ports in fragments equal in size to one or two RFIFO elements, that is, MPKTs. The specified receive processing thread 96 responds to the signal event by reading the control information from the RCV_CTL register 232 (transaction 7). It uses the control information to determine, among other pieces of information, where the data is located in the RFIFO 136. The receive processing thread 96 reads the data from the RFIFO 136 on quadword boundaries into its read transfer registers or moves the data directly into the SDRAM (transaction 8).

The RCV_REQ register 230 is used to initiate a receive transfer on the Fbus and is mapped to a two-entry FIFO that is written by the microengines. The I/O bus interface provides signals (not shown) to the receive scheduler thread indicating that the RCV_REQ FIFO 236 has room available for another receive request and that the last issued receive request has been stored in the RCV_REQ register 230.

Figure 10A:
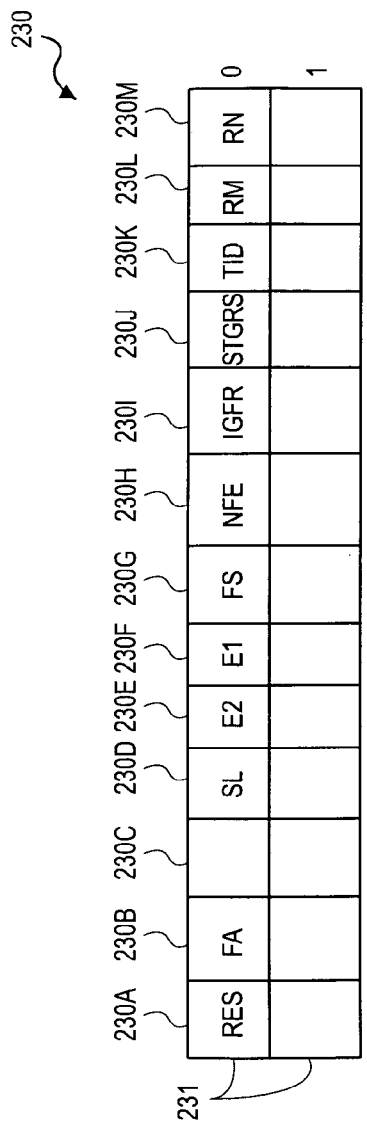
FIGS. 10A and 10B are illustrations of the format of the RCV_REQ FIFO and the RCV_CTL FIFO, respectively.

Referring to FIG. 10A, the RCV_REQ FIFO 230 includes two entries 231. The format of each entry 231 is as follows. The first two bits correspond to a reserved field 230a. Bit 29 is an FA field 230b for specifying the maximum number of Fbus accesses to be performed for this request. A THSG field (bits 28:27) 230c is a two-bit thread message field that allows the scheduler thread to pass a message to the assigned receive thread through the ready state machine, which copies this message to the RCV_CNTL register. An SL field 230d (bit 26) is used in cases where status information is transferred following the EOP MPKT. It indicates whether two or one 32-bit bus accesses are required in a 32-bit Fbus configuration. An E1 field 230e (bits 21:18) and an E2 field (bits 25:22) 230f specify the RFIFO element to receive the transferred data. If only 1 MPKT is received, it is placed in the element indicated by the E1 field. If two MPKTs are received, then the second MPKT is placed in the RFIFO element indicated by the E2 field. An FS field (bits 17:16) 230g specifies use of a fast or slow port mode, that is, whether the request is directed to a fast or slow port. The fast port mode setting signifies to the RSM that a sequence number is to be associated with the request and that it will be handling speculative requests, which will be discussed in further detail later. An NFE field (bit 15) 230h specifies the number of RFIFO elements to be filled (i.e., one or two elements). The IGFR field (bit 13) 230i is used only if fast port mode is selected and indicates to the RSM that it should process the request regardless of the status of the fast ready flag pins. An SIGRS field (bit 11) 230j, if set, indicates that the receive scheduler be signaled upon completion of the receive request. A TID field (bits 10:6) 230k specifies the receive thread to be notified or signaled after the receive request is processed. Therefore, if bit 11 is set, the RCV_REQ entry must be read twice, once by the receive thread and once by the receive scheduler thread, before it can be removed from the RCV_REQ FIFO. An RM field (bits 5:3) 230i specified the ID of the MAC device that has been selected by the receive scheduler. Lastly, an RP field (bits 2:0) 230m specifies which port of the MAC device specified in the RM field 230i has been selected.

The RSM 166 reads the RCV_REQ register entry 231 to determine how it should receive data from the Fbus 132, that is, how the signaling should be performed on the Fbus, where the data should be placed in the RFIFO and which microengine thread should be signaled once the data is received. The RSM 166 looks for a valid receive request in the RCV_REQ FIFO 230. It selects the MAC device identified in the RM field and selects the specified port within the MAC by asserting the appropriate control signals. It then begins receiving data from the MAC device on the Fbus data lines. The receive state machine always attempts to read either eight or nine quadwords of data from the MAC device on the Fbus as specified in the receive request. If the MAC device asserts the EOP signal, the RSM 166 terminates the receive early (before eight or nine accesses are made). The RSM 166 calculates the total bytes received for each receive request and reports the value in the REC_CNTL register 232. If EOP is received, the RSM 166 determines the number of valid bytes in the last received data cycle.

The RCV_CNTL register 232 is mapped to a four-entry FIFO (referred to herein as RCV_CNTL_FIFO 232) that is written by the receive state machine and read by the microengine thread. The I/O bus interface 28 signals the assigned thread when a valid entry reaches the top of the RCV_CNTL FIFO. When a microengine thread reads the RCV_CNTL register, the data is popped off the FIFO. If the SIGRS field 230i is set in the RCV_REQ register 230, the receive scheduler thread 92 specified in the RCV_CNTL register 232 is signaled in addition to the thread specified in TID field 230k. In this case, the data in the RCV_CNTL register 232 is read twice before the receive request data is retired from the RCV_CTL FIFO 232 and the next thread is signaled. The receive state machine writes to the RCV_CTL register 232 as long as the FIFO is not full. If the RCV_CTL FIFO 232 is full, the receive state machine stalls and stops accepting any more receive requests.

Figure 10B:
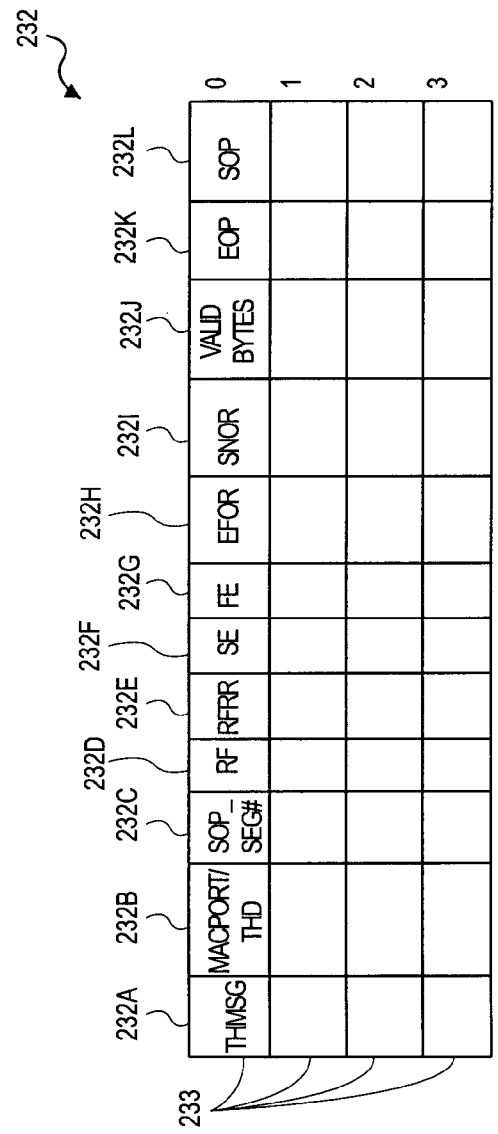

Referring to FIG. 10B, the RCV_CNTL FIFO 232 provides instruction to the signaled thread (i.e., the thread specified in TID) to process the data. As indicated above, the RCV_CNTL FIFO includes 4 entries 233. The format of the RCV_CNTL FIFO entry 233 is as follows: a THMSG field (31:30) 23a includes the 2-bit message copied by the RSM from REC_REQ register[28:27]. A MACPORT/THD field (bits 29:24) 232b specifies either the MAC port number or a receive thread ID, as will be described in further detail below. An SOP SEQ field (23:20) 232c is used for fast ports and indicates a packet sequence number as an SOP (start-of-packet) sequence number if the SOP was asserted during the receive data transfer and indicates an MPKT sequence number if SOP was not so asserted. An RF field 232d and RERR field 232e (bits 19 and 18, respectively) both convey receive error information. An SE field 232f (17:14) and an FE field 232g (13:10) are copies of the E2 and E1 fields, respectively, of the REC_REQ. An EF field (bit 9) 232h specifies the number of RFIFO elements which were filled by the receive request. An SN field (bit 8) 232i is used for fast ports and indicates whether the sequence number specified in SOP_SEQ field 232c is associated with fast port 1 or fast port 2. A VLD BYTES field (7:2) 232j specifies the number of valid bytes in the RFIFO element if the element contains in EOP MPKT. An EOP field (bit 1) 232k indicates that the MPKT is an EOP MPKT. An SOP field (bit 0) 2321 indicates that the MPKT is an SOP MPKT.

Figure 11:
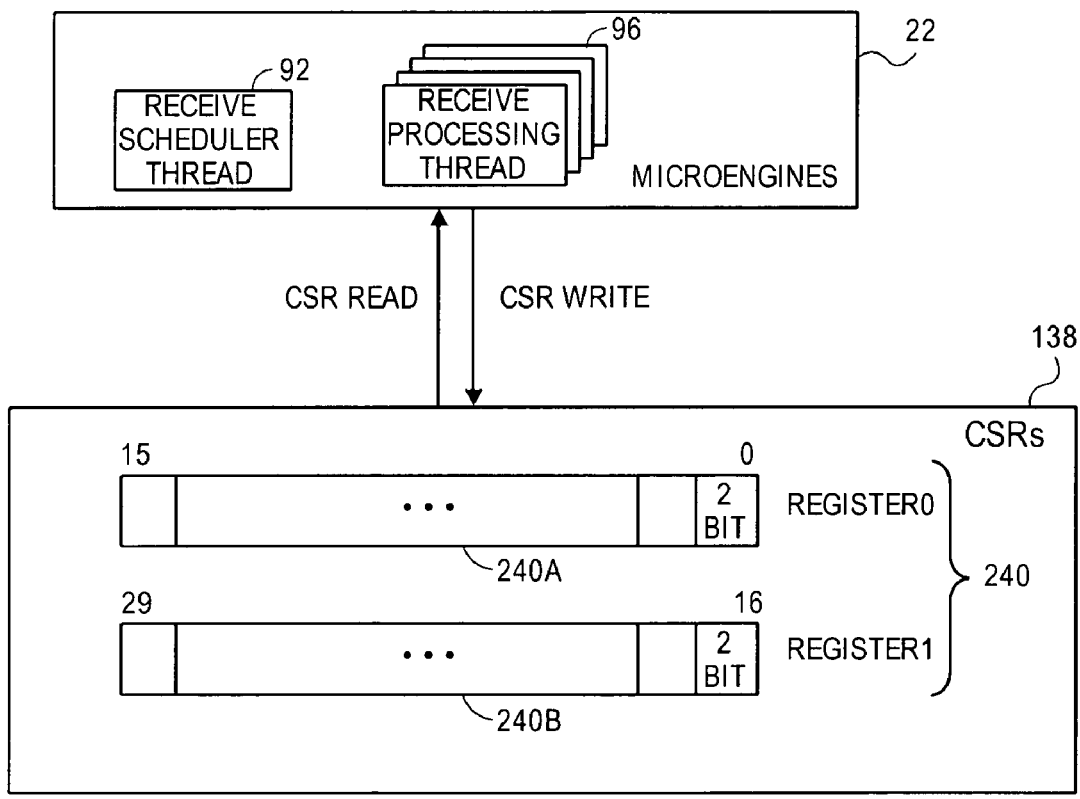
FIG. 11 is an illustration of the thread done registers.

FIG. 11 illustrates the format of the thread done registers 240 and their interaction with the receive scheduler and processing threads 92, 96, respectively, of the microengines 22. The thread done registers 240 include a first thread status register, TH_DONE_REG0 240a, which has 2-bit status fields 241a corresponding to each of threads 0 through 15. A second thread status register, TH_DONE_REG1 240b, has 2-bit status fields 241b corresponding to each of threads 16 through 23. These registers can be read and written to by the threads using a CSR instruction (or fast write instruction, described below). The receive scheduler thread can use these registers to determine which RFIFO elements are not in use. Since it is the receive scheduler thread 92 that assigns receive processing threads 96 to process the data in the RFIFO elements, and it also knows the thread processing status from the THREAD_DONE_REG0 and THREAD_DONE_REG1 registers 240a, 240b, it can determine which RFIFO elements are currently available.

The THREAD_DONE CSRs 240 support a two-bit message for each microengine thread. The assigned receive thread may write a two-bit message to this register to indicate that it has completed its task. Each time a message is written to the THREAD_DONE register, the current message is logically ORed with the new message. The bit values in the THREAD_DONE registers are cleared by writing a "1", so the scheduler may clear the messages by writing the data read back to the THREAD_DONE register. The definition of the 2-bit status field is determined in software. An example of four message types is illustrated in TABLE 1 below.

TABLE 1

| 2-BIT MESSAGE | DEFINITION |
|---|---|
| 00 | Busy. |
| 01 | Idle, processing complete. |
| 10 | Not busy, but waiting to finish processing of entire packet. |
| 11 | Idle, processing complete for an EOP MPKT. |

The assigned receive processing threads write their status to the THREAD_DONE register whenever the status changes. For example, a thread may immediately write 00 to the THREAD_DONE register after the receive state machine signals the assigned thread. When the receive scheduler thread reads the THREAD_DONE register, it can look at the returned value to determine the status of each thread and then update its thread/port assignment list.

The microengine supports a fast_wr instruction that improves performance when writing to a subset of CSR registers. The fast_wr instruction does not use the push or pull engines. Rather, it uses logic that services the instruction as soon as the write request is issued to the FBI CSR. The instruction thus eliminates the need for the pull engine to read data from a microengine transfer register when it processes the command. The meaning of the 10-bit immediate data for some of the CSRs is shown below.

TABLE 2

| CSR | 10-BIT IMMEDIATE DATA |
|---|---|
| INTER_THD_SIG | Thread number of the thread that is to be signaled. |
| THREAD_DONE | A 2-bit message that is shifted into a position relative to the thread that is writing the message. |
| THREAD_DONE_INCR1 | Same as THREAD_DONE except that |
| THREAD_DONE_INCR2 | either the enqueue_seq1 or enqueue_seq2 is also incremented. |
| INCR_ENQ_NUM1 | Write a one to increment the enqueue |
| INCR_ENQ_NUM2 | sequence number by one. |

It will be appreciated that the receive process as described herein assumes that no packet exemptions occurred, that is, that the threads are able to handle the packet processing without assistance from the core processor. Further, the receive process as described also assumes the availability of FIFO space. It will be appreciated that the various state machines must determine if there is room available in a FIFO, e.g., the RFIFO, prior to writing new entries to that FIFO. If a particular FIFO is full, the state machine will wait until the appropriate number of entries has been retired from that FIFO.

Sequenced Receive of Fast Network Port Streams of Data

Figure 12:
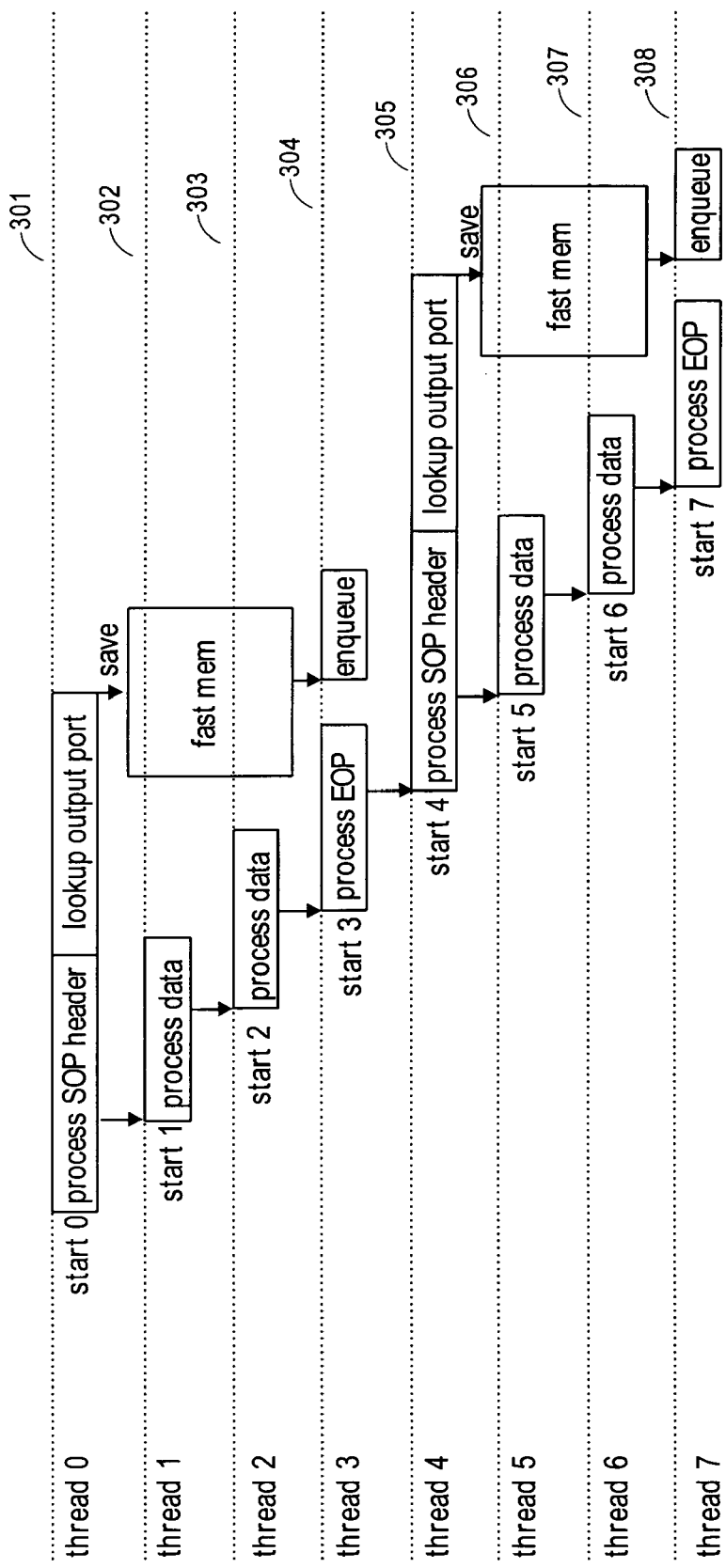
FIG. 12 shows a graphical overview of multiple receive threads processing network data.

FIG. 12 shows a graphical overview of multiple receive threads processing network data. The process will be described in more detail with respect to FIGS. 13–15. The network data is received over a bus interface that is connected to a MAC, each with one or more ports that are in turn connected to networks.

A hardware sequencer wakes each thread when packet data is available for it. The thread then reads a receive control register that has information such as bus transaction status (cancel, error or fail), port ID, SOP, EOP, and byte count. Thread 0 (301) receives the first 64 byte section, which is the SOP MPKT. It reads the header portion of the SOP MPKT, verifies the header fields and uses certain of the fields to lookup the output port. The thread processing a SOP MPKT (the "SOP thread") takes a relatively long time to process the header and perform the lookup compared the time it takes to process other types of MPKTs. When the SOP thread is done, it saves the value of the output port to a port mailbox. In one embodiment, the port mailbox is maintained in fast memory and is associated with the receive port ID.

While thread 0 is processing its data, packet data is arriving at a very high rate, faster than thread 0 can handle. The bus interface wakes thread 1 (302), which gets its receive control information. Thread 1 determines that this is a mid-packet MPKT (neither a SOP nor EOP MPKT). It need only move the packet data to memory, and then become available again. In this example, thread 0 is still processing its data.

The bus interface then wakes thread 2 (303), which gets receive control for its MPKT. Thread 2 also determines that this is a mid-packet MPKT, and moves its packet data to memory and becomes available again. Next the bus interface wakes thread 3, which is an EOP MPKT. For Ethernet packets, there can be up to 24 bus transactions from the SOP MPKT to the EOP MPKT. Thread 3 waits for the output port to be saved to the port mailbox by checking whether there is valid output port information. In one embodiment, the valid output port information is checked using a test and set, test and clear, or other asynchronous message mechanism. Thread 3 then enqueues the packet data, i.e., places the packet data in a queue to be sent to the output port.

Processing of the next data packet now begins. Thread 4 through thread 7 (305–308) behave in a fashion similar to that described with respect to threads 0 through thread 3 (301–304).

FIG. 13 shows a flowchart of the process that receive threads take based on the type of MPKT that they process. After a receive thread is awakened by the bus interface, it reads the control receive (box 401), which was described with respect to FIG. 12. The state is restored (box 402) from the previous thread.

The state information is stored in a state mailbox. In one embodiment, the state mailbox is maintained in fast memory and includes 1) an address pointer, for calculating the address in DRAM where the entire packet will be stored; 2) a freelist ID, that identifies a list from which the pointer to the current packet data was obtained; 3) an element count, that is a count of the MPKT sections processed so far; 4) a packet sequence number, that is used to insure that packets are enqueued (queued up to be transmitted out of the processor) in order; and 5) a discard flag, that specifies that during processing, a thread has decided to discard the packet.

The bus interface can place a cancel message in the receive control register. If this occurs, the thread merely passes state to the next thread (proceeds from box 403 to box 405). The bus interface can also set an error bit in the receive control, in which case the thread will set the discard flag and save state to the next thread. (proceeds from box 403 to boxes 404 and 405).

In one embodiment, the processing of a packet is not complete until an EOP or FAIL is received. (FAIL is a serious error, and is treated like an EOP). If there was neither a cancel message nor an error bit set in the receive control, operation goes from box 403 to box 406. If the thread is a SOP thread, then operation proceeds to box 410, at which the thread assembles state information.

In one embodiment, the state information includes an address pointer, a freelist ID, element count, packet sequence number and discard flag, as previously described. The thread determines the address pointer, i.e., the location for the packet data in memory, and determines what freelist it got the address pointer from. There can be more than one freelist. For example, one freelist may be used to allocate memory in one DRAM bank and another freelist may be used to allocate memory in another DRAM bank. The SOP thread sets the element count to 1. Every thread thereafter will increment the element count by 1 until the EOP MPKT is received. The SOP thread also saves the packet sequence number. This number is placed in the receive control register by the bus transfer interface while the SOP MPKT is being processed. It will be used by the EOP thread to guarantee successive packets are enqueued in order. The SOP thread saves the state to the state mailbox (box 411), stores the section of packet data to DRAM (box 412), verifies the header and looks up the output port (box 413), and then saves the output port information to the port mailbox (box 414).

At box 406, if the thread is processing a mid-packet MPKT (not processing a SOP MPKT or EOP MPKT), the thread increments the element count (box 420), saves state (box 421), and stores the data section to the next section of the DRAM memory buffer (box 422).

At box 406, if the thread is processing an EOP MPKT (an "EOP thread"), then the thread increments the element count (box 430), saves a null state for the next thread (box 431) (which should be an SOP MPKT for a frame-based application, as described below), stores data to the next section of the DRAM memory buffer (box 432), and restores the output port information from the port mailbox. (In an alternate embodiment of a frame-based application, the EOP thread does not save state information to, and the subsequent SOP thread does not retrieve state information from a state mailbox.)

Note that all threads restore, update and save state as soon as possible after reading receive control. This allows overlapped threads to continually receive new packet sections at the line rate of the network. After saving state, they continue to process by moving the data to DRAM as soon as possible. This allows the bus interface buffer to be freed and used for more data streaming from the network. The thread can read the data in parallel with it being stored to memory. It then can parse, verify, modify and otherwise process the data, without impacting the receive rate. In one embodiment, a valid bit is set in a mailbox by the save operation, and is cleared by the restore operation. If, on restore, the valid bit is not set, then the restore is retried until the valid bit is set.

FIG. 14 shows one embodiment of a state mailbox used to transfer state from one thread to another. In this embodiment, first thread 450 saves state to the mailbox 452, which includes an address pointer, a freelist ID, element count, packet sequence number and discard flag. The next thread 454 restores state by retrieving the state information from the state mailbox. In one embodiment, the state mailbox is maintained in fast memory so that threads from all of the microengines have access. In another embodiment, the mailbox may be maintained in a register.

The embodiment for some applications is to have one mailbox per thread, i.e., each thread writes to the next thread's mailbox. Frame-based applications receive a contiguous set of packet sections starting with a SOP MPKT and ending with an EOP MPKT. A separate mailbox per thread is one way to handle frame-based applications.

Cell-based applications (e.g., ATM) receive sections of one packet interleaved with sections of another packet. A typical embodiment for these applications is to have the mailbox at a Virtual Circuit (VC) block of memory. The restore and save are to this mailbox. However, there can be many Virtual Circuits. On every packet section a Virtual Circuit lookup is performed. If on successive packet sections, the Virtual Circuit is the same, they are restored and saved to the same VC mailbox.

Figure 15:
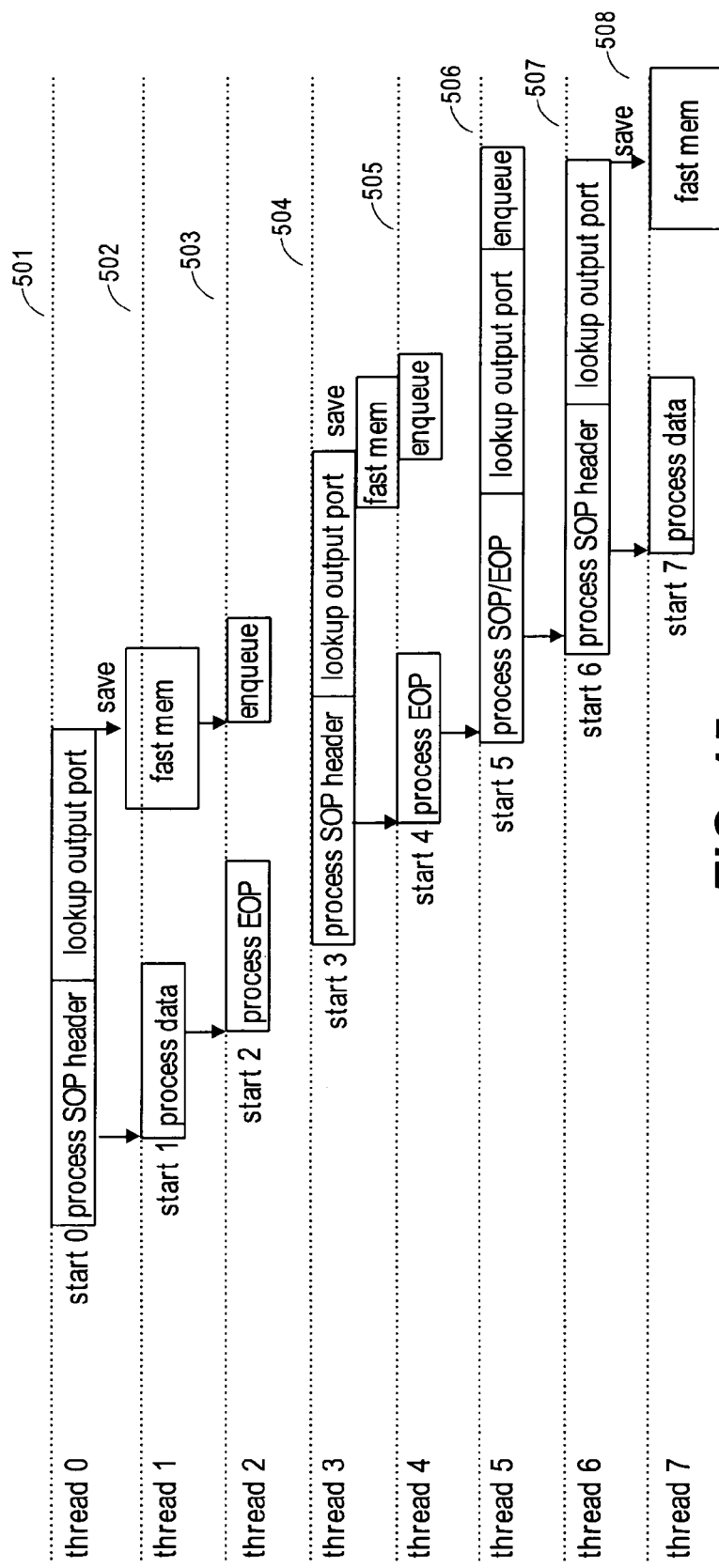
FIG. 15 shows another example of multiple threads processing packet data.

FIG. 15 shows another example of multiple threads (501–508) processing packet data. This example highlights the thread behavior for packets of various lengths. In this example, threads 0–2 (501–503) process a 3-section packet, threads 3–4 (504–505) process a 2-section packet, thread 5 (506) processes a 1-section packet, and so on. It can be seen that the receive data rate is maintained, regardless of packet length.

In one embodiment, application software for programming the receive threads to operate in the network processor as described can be provided as instructions stored on floppy disk, CD-ROM, or other storage media. Alternatively, the application software can be downloaded via the Internet. The application software is then installed to a storage medium on the host system, such as a hard disk, random access memory, or non-volatile memory.

Thus, a method of processing network data in a network processor includes using multiple receive threads to process different portions of a data packet. This scheme allows the network processor to receive data at the full line rate. However, the specific arrangements and methods described herein are merely illustrative of the principles of this invention. For example, the first mailbox could alternatively be implemented by successively storing to different physical locations instead of a static buffer area. Numerous modifications in form and detail may be made without departing from the scope of the described invention. Although this invention has been shown in relation to a particular embodiment, it should not be considered so limited. Rather, the described invention is limited only by the scope of the appended claims.

What is claimed is:

1. A method of processing a data packet comprising:
    using a first thread to process a first section of the data packet, the first thread saving state information to a first mailbox, storing the first section of the data packet to a memory and saving output port information to a second mailbox;
    using two or more middle threads to process a middle section of the data packet, each of the two or more middle threads retrieving the state information from the first mailbox, incrementing an element counter, saving updated state information to the first mailbox, and storing the middle section of the data packet to the memory;
    using a final thread to process a last section of the data packet, the final thread retrieving the state information from the first mailbox, incrementing the element counter, retrieving the output port information from the second mailbox, and storing the last section of the data packet to the memory.

2. The method of claim 1 further comprising:
    queueing the data packet by the final thread to be transmitted based on the output port information.

3. The method of claim 1, wherein the first mailbox is a virtual mailbox and stores to different physical locations.

4. An article comprising a computer-readable medium which store computer-executable instructions for receiving data from a plurality of ports, the instructions causing a computer to:
    use a first thread to process a first section of a data packet including saving state information to a first mailbox, storing the first section of the data packet to a memory, and saving output port information to a second mailbox;
    use a middle thread to process a middle section of the data packet including retrieving the state information from the first mailbox, incrementing an element counter, saving updated state information to the first mailbox, and storing the middle section of the data packet to the memory; and
    use a final thread to process a last section of the data packet including retrieving the state information from the first mailbox, incrementing the element counter, retrieving the output port information from the second mailbox, and storing the last section of the data packet to the memory.

5. The article of claim 4, the article further comprises instructions to: queue the data packet by the final thread to be transmitted based on the output port information.

6. The article of claim 4, wherein the threads comprise threads provided by multiple programmable multi-threaded engines integrated within a processor.

7. The article of claim 6, wherein the data packet comprises an Ethernet packet.

* * * * *